United States Patent
Numata et al.

(10) Patent No.: US 9,966,634 B2
(45) Date of Patent: May 8, 2018

(54) HEAT RESISTANT BATTERY AND METHOD FOR CHARGING AND DISCHARGING THE SAME

(71) Applicant: Sumitomo Electric Industries, Ltd., Osaka-shi (JP)

(72) Inventors: Koma Numata, Osaka (JP); Shinji Inazawa, Osaka (JP); Koji Nitta, Osaka (JP); Shoichiro Sakai, Osaka (JP); Atsushi Fukunaga, Osaka (JP); Eiko Itani, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 424 days.

(21) Appl. No.: 14/414,748

(22) PCT Filed: Jul. 2, 2013

(86) PCT No.: PCT/JP2013/068125
§ 371 (c)(1),
(2) Date: Jan. 14, 2015

(87) PCT Pub. No.: WO2014/021044
PCT Pub. Date: Feb. 6, 2014

(65) Prior Publication Data
US 2015/0229004 A1 Aug. 13, 2015

(30) Foreign Application Priority Data

Aug. 1, 2012 (JP) .................................. 2012-171020

(51) Int. Cl.
*H01M 10/00* (2006.01)
*H01M 10/0568* (2010.01)
(Continued)

(52) U.S. Cl.
CPC ..... *H01M 10/0568* (2013.01); *H01M 2/1613* (2013.01); *H01M 4/40* (2013.01);
(Continued)

(58) Field of Classification Search
CPC ...... H01M 4/583; H01M 4/587; H01M 4/622; H01M 10/399; H01M 10/0568
See application file for complete search history.

(56) References Cited

U.S. PATENT DOCUMENTS 5,652,072 A * 7/1997 Lamanna .......... H01M 10/0568
429/245
8,168,331 B2 5/2012 Best et al.
(Continued)

FOREIGN PATENT DOCUMENTS

JP 2006-196390 A 7/2006
JP 2007-517364 A 6/2007
(Continued)

OTHER PUBLICATIONS

Premkumar Senguttuvan et al., "Na2Ti3O7: Lowest Voltage Ever Reported Oxide Insertion Electrode for Sodium Ion Batteries," Chemistry of Materials, vol. 23, Aug. 30, 2011, pp. 4109-4111.
(Continued)

*Primary Examiner* — Nicholas P D'Aniello
(74) *Attorney, Agent, or Firm* — Venable LLP; Michael A. Sartori; Kerri M. Patterson (57) ABSTRACT

A heat resistant battery includes a positive electrode including a positive electrode current collector and a positive electrode active material fixed on the positive electrode current collector, wherein the positive electrode active material includes a sodium-containing transition metal compound capable of electrochemically storing and releasing a sodium ion; a negative electrode including a negative electrode current collector and a negative electrode active mate-
(Continued)

rial fixed on the negative electrode current collector, wherein the negative electrode active material contains at least one selected from the group consisting of a sodium-containing titanium compound and a non-graphitizable carbon, each of the sodium-containing titanium compound and the non-graphitizable carbon capable of storing and releasing a sodium ion at a lower potential than a potential of the sodium-containing transition metal compound; and a sodium ion-conductive electrolyte provided at least between the positive electrode and the negative electrode, wherein the sodium ion-conductive electrolyte includes a salt of an organic cation having a pyrrolidinium skeleton and a bis(perfluoroalkyl sulfonyl)imide anion.

10 Claims, 9 Drawing Sheets (51) Int. Cl.
  *H01M 10/054*    (2010.01)
  *H01M 2/16*      (2006.01)
  *H01M 10/0561*   (2010.01)
  *H01M 10/39*     (2006.01)
  *H01M 4/40*      (2006.01)
  *H01M 4/583*     (2010.01)
  *H01M 4/62*      (2006.01)
  *H02J 7/00*      (2006.01)
  *H01M 4/485*     (2010.01)
  *H01M 4/587*     (2010.01)
(52) U.S. Cl.
  CPC ......... *H01M 4/485* (2013.01); *H01M 4/583* (2013.01); *H01M 4/622* (2013.01); *H01M 10/054* (2013.01); *H01M 10/0561* (2013.01); *H01M 10/399* (2013.01); *H02J 7/0052* (2013.01); *H01M 2/162* (2013.01); *H01M 2/1653* (2013.01); *H01M 4/587* (2013.01); *H01M 2220/10* (2013.01); *H01M 2300/002* (2013.01); *H01M 2300/0025* (2013.01)

(56) References Cited

U.S. PATENT DOCUMENTS

| | | | |
|---|---|---|---|
| 2012/0021273 A1* | 1/2012 | Ohmori | H01M 2/1686 429/144 |
| 2012/0115002 A1* | 5/2012 | Fukunaga | H01M 10/399 429/103 |
| 2012/0129056 A1 | 5/2012 | Majima et al. | |
| 2014/0093757 A1 | 4/2014 | Sakai et al. | |
| 2014/0170458 A1 | 6/2014 | Nitta et al. | |

FOREIGN PATENT DOCUMENTS

| | | | |
|---|---|---|---|
| JP | 2011-142016 A | 7/2011 | |
| WO | WO 2010110465 A1 * | 9/2010 | H01M 2/1686 |
| WO | WO-2011/111566 A1 | 9/2011 | |
| WO | WO 2011148864 A1 * | 12/2011 | H01M 10/399 |
| WO | WO-2012/073653 A1 | 6/2012 | |
| WO | WO-2013/002359 A1 | 1/2013 | |

OTHER PUBLICATIONS

Keisuke Kuroda et al., "NaFSA-MPPyrFSA Nigen-kei Ion Ekitai o Mochiita Sodium Niji Denchi (Sodium secondary battery using binary Na-FSA-MPPyrFSA Ionic Liquid)," Abstracts, Battery Symposium in Japan, vol. 52, Oct. 19, 2011, p. 234.
International Search Report issued in PCT/JP2013/068125 dated Sep. 10, 2013.

* cited by examiner

HEAT RESISTANT BATTERY AND METHOD FOR CHARGING AND DISCHARGING THE SAME

TECHNICAL FIELD

The present invention relates to a heat resistant battery which can be used in a heated condition in a temperature range of, for example, 120° C. or more and 300° C. or less, and also to a method for charging and discharging the battery.

BACKGROUND ART

In recent years, attention has been directed to techniques for converting natural energy such as solar light and wind power into electrical energy. In addition, there has been an increasing demand for a non-aqueous electrolyte secondary battery as a high energy-density battery capable of storing a large amount of electrical energy. Among non-aqueous electrolyte secondary batteries, a lithium ion secondary battery is promising because of their light weight and high electromotive force. However, it is difficult to use continuously a lithium ion secondary battery at a high temperature of, for example, 80° C. or more. Moreover, the cost of a lithium resource is increasing. Thus, development efforts have been directed at a sodium ion secondary battery which can be stably charged and discharged even in a high temperature environment, as a heat resistant battery. For example, a temperature in usage environment for a sensor provided in a high temperature furnace (electric furnace) ranges from 120 to 300° C. Therefore a battery used as a power source of such a sensor needs to be heat resistant equal to that of the sensor.

In a sodium ion secondary battery, a sodium ion-conductive electrolyte is used. The electrolyte is also required to be heat resistant considering a high temperature environment in which a battery is used. Thus, as a electrolyte having high heat resistance and a low melting point, a mixture of sodium bis(fluorosulfonyl)imide (NaFSA) and potassium bis(fluorosulfonyl)imide (KFSA) has been developed. Moreover, there has been proposed a salt of an organic cation and a sulfonyl anion, a salt of an organic cation and a fluoroborate anion, and the like (Patent Literature 1).

CITATION LIST

Patent Literature

Patent Literature 1: Japanese Unexamined Patent Publication No. 2006-196390

SUMMARY OF INVENTION

Technical Problem

However, conventional sodium ion secondary batteries operate, indeed, in a temperature range higher than an operating temperature range of lithium ion secondary batteries, but the assumed operating temperature is around 100° C. Therefore, it is difficult to use a conventional sodium ion secondary battery in the long-term in a higher temperature range of, for example, 120° C. to 300° C.

In addition, even if the electrolyte does not cause pyrolysis at a temperature of 300° C. or less, an electrolyte in a molten state (a salt in a molten state (molten salt) is hereinafter also referred to as ionic liquid) is likely to cause a side reaction with various components contained in the battery when the battery is repeatedly charged and discharged in a high temperature range. For example, during charging and discharging the battery, oxidative decomposition or reductive decomposition of the electrolyte may occur respectively on a surface of the positive or negative electrode even below the pyrolysis temperature of the ionic liquid. As a result of the side reaction, degradation of the electrolyte and of other components in the battery is progressed, thereby causing deterioration in cycle characteristics of the battery.

Solution to Problem

In view of the foregoing, one aspect of the present invention relates to a heat resistant battery including:

a positive electrode including a positive electrode current collector and a positive electrode active material fixed on the positive electrode current collector, wherein the positive electrode active material includes a sodium-containing transition metal compound capable of electrochemically storing and releasing a sodium ion, a negative electrode including a negative electrode current collector and a negative electrode active material fixed on the negative electrode current collector, wherein the negative electrode active material includes at least one selected from the group consisting of a sodium-containing titanium compound and a non-graphitizable carbon (hard carbon), each of the sodium-containing titanium compounds and the non-graphitizable carbon being capable of storing and releasing a sodium ion at a lower potential than a potential of the sodium-containing transition metal compound, and a sodium ion-conductive electrolyte provided at least between the positive electrode and the negative electrode, wherein the sodium ion-conductive electrolyte includes a salt of an organic cation having a pyrrolidinium skeleton and a bis(perfluoroalkyl sulfonyl)imide anion.

The heat resistant battery described above is suitable for use in a temperature range of, for example, 120° C. or more and 300° C. or less.

A separator can further be provided between the positive electrode and the negative electrode. The separator is preferably formed of at least one selected from the group consisting of a glass fiber and polyphenylene sulfite (PSS).

The positive electrode can include a first heat resistant binding agent which binds the positive electrode active material on the positive electrode current collector, and the negative electrode can include a second heat resistant binding agent which binds the negative electrode active material on the negative electrode current collector. The first heat resistant binding agent and the second heat resistant binding agent each independently include at least one selected from the group consisting of polyamide, polyimide, and polyamideimide.

Another aspect of the present invention relates to a charging and discharging method including the step of charging and discharging the heat resistant battery described above in a heated condition in a temperature range of 120° C. or more and 300° C. or less.

Advantageous Effects of Invention

According to a heat resistant battery of the present invention, at least the electrolyte and the electrode materials are selected in combination so that a side reaction will not readily occur even in a high temperature environment. Thus, charging and discharging can be stably performed even in a high temperature environment. A heat resistant battery of the present invention can achieve excellent cycle characteristics even during use in a higher temperature range of, for example, 120° C. to 300° C.

DESCRIPTION OF EMBODIMENTS

The heat resistant battery of the present invention is a molten-salt battery assumed to be used in an operating temperature range within a high temperature range of, for example, 120° C. or more and 300° C. or less. The electrolyte can be in a molten state (ionic liquid) in the assumed operating temperature range, but is preferably in a molten state also at a temperature below 120° C. for being suitable for use at a lower temperature.

Assuming that a battery is charged and discharged for a long time in a higher temperature range of 120° C. or more and 300° C. or less, the electrolyte is required not only to be an ionic liquid in the operating temperature range, but also to have excellent thermal stability. From a viewpoint of satisfying such a demand, the sodium ion-conductive electrolyte includes at least a salt of an organic cation having a pyrrolidinium skeleton and a bis(perfluoroalkyl sulfonyl)imide anion. Use of a salt of an organic cation having a pyrrolidinium skeleton and a bis(perfluoroalkyl sulfonyl)imide anion can even provide an electrolyte having a pyrolysis temperature of, for example, above 300° C.

When being heated alone, even an electrolyte which exhibits a high pyrolysis temperature is continuously affected by the positive-electrode potential and by the negative-electrode potential in a battery which is repeatedly charged and discharged. Thus, the electrolyte is required to have not only thermal stability, but also excellent electrochemical stability. However, it is thought that electrochemical stability not only depends on the properties of the electrolyte itself, but also is significantly affected by materials of components (particularly the positive electrode and the negative electrode) in the battery that contact with the electrolyte.

On the other hand, the electrolyte becomes to exhibit excellent electrochemical stability, by combining a sodium ion-conductive electrolyte including a salt of an organic cation having a pyrrolidinium skeleton and a bis(perfluoroalkyl sulfonyl)imide anion; a positive electrode including a sodium-containing transition metal compound as a positive electrode active material; and a negative electrode containing at least one selected from the group consisting of a sodium-containing titanium compound and a non-graphitizable carbon (hard carbon) as a negative electrode active material. Accordingly, even when charging and discharging is repeated for a long time in a higher temperature range of 120° C. or more and 300° C. or less, excellent cycle characteristics can be achieved.

Here, "thermal stability of an electrolyte" can be evaluated on the basis of the pyrolysis temperature in a case where the electrolyte is heated alone. The pyrolysis temperature of an electrolyte can be measured by, for example, heating a sample of the electrolyte enclosed solely in an aluminum (Al) cell with a use of a differential scanning calorimeter.

The positive electrode includes a positive electrode current collector and a positive electrode active material fixed on the positive electrode current collector, and can also include, as optional components, a binding agent, a conductive agent, and the like. As the positive electrode active material, a sodium-containing transition metal compound is used from a viewpoint of both thermal stability and electrochemical stability.

The negative electrode includes a negative electrode current collector and a negative electrode active material fixed on the negative electrode current collector, and can also include, as optional components, a binding agent, a conductive agent, and the like. The negative electrode active material is a material capable of storing and releasing a sodium ion at a lower potential than a potential of the sodium-containing transition metal compound used in the positive electrode. As the negative electrode active material, at least one selected from the group consisting of a sodium-containing titanium compound and a non-graphitizable carbon is used from a viewpoint of both thermal stability and electrochemical stability.

A separator is preferably provided between the positive electrode and the negative electrode. The separator plays a role of physical separation of the positive electrode from the negative electrode, and prevention of internal short-circuiting. The separator is made of a porous material, and the pores are impregnated with an electrolyte. Therefore, ion conduction paths between the positive electrode and the negative electrode are maintained. However, the separator needs to have a heatproof temperature similar to or higher than the heatproof temperature of the electrolyte. The heatproof temperature of a separator usually means a temperature at which the separator can maintain its porous structure.

Each of the components of a heat resistant battery will now be described in more detail.

[Positive Electrode]

Figure 1:
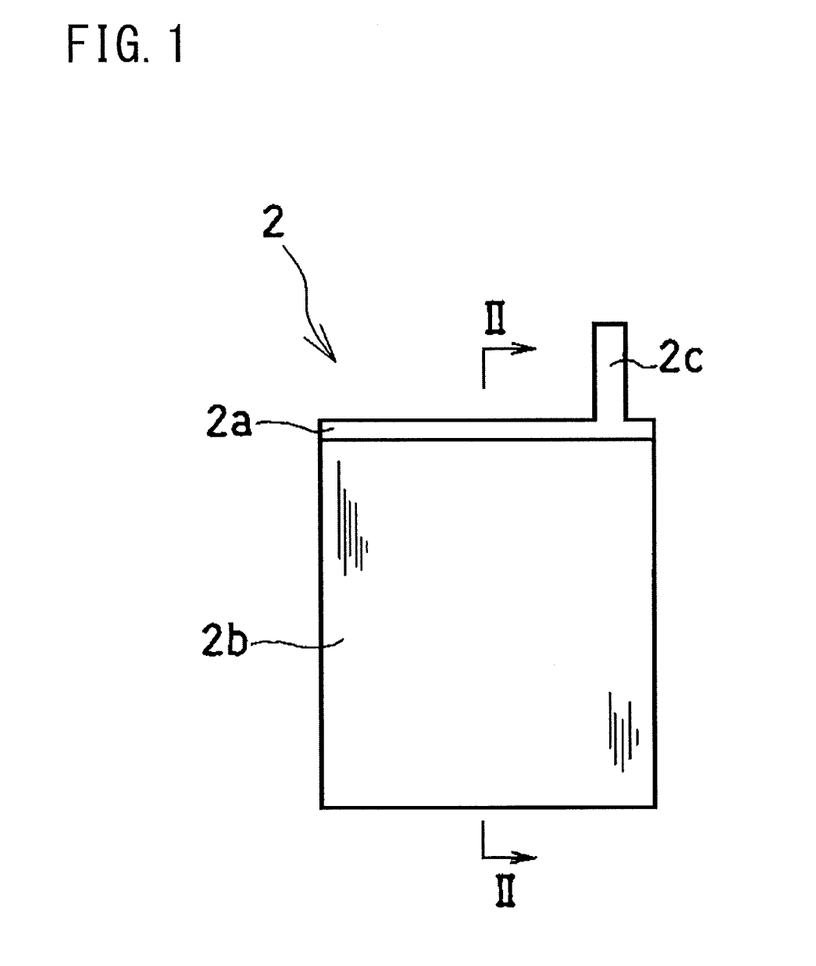
FIG. 1 is a front view of a positive electrode according to one embodiment of the present invention.
Figure 2:
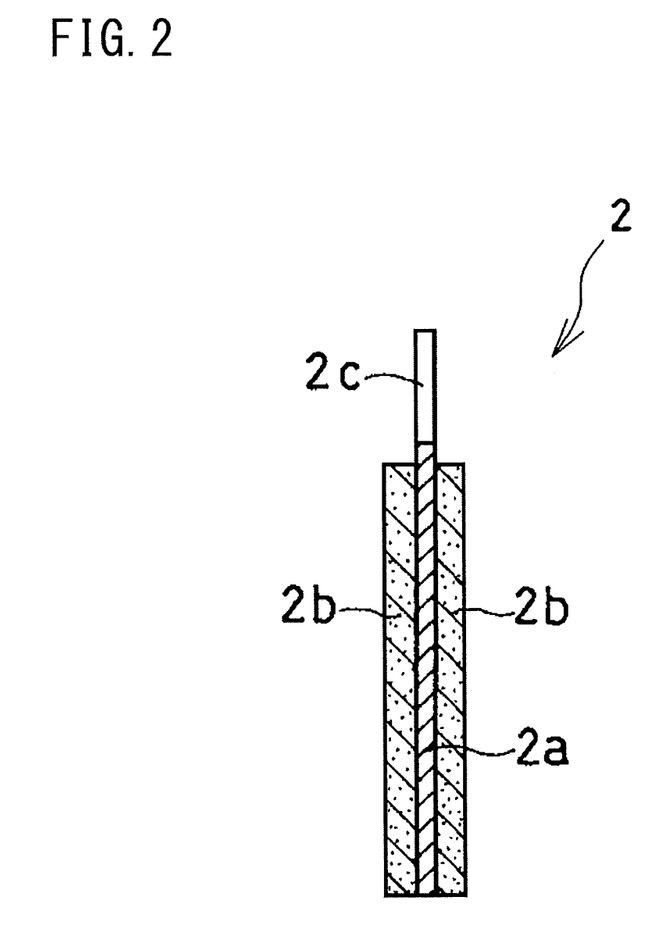
FIG. 2 is a cross-sectional view taken along line II-II of FIG. 1.

FIG. 1 is a front view of a positive electrode according to one embodiment of the present invention. FIG. 2 is a cross-sectional view taken along line II-II of FIG. 1.

A positive electrode 2 includes a positive electrode current collector 2a and a positive electrode mixture 2b fixed on the positive electrode current collector 2a. The positive electrode mixture 2b includes, for example, a positive electrode active material, a first heat resistant binding agent, and a conductive agent.

As the positive electrode current collector 2a, metal foil, a metal fiber non-woven fabric, a metal porous sheet, or the like can be used. The metal constituting the positive electrode current collector is preferably aluminum or an aluminum alloy due to its stability at the positive-electrode potential, but is not particularly limited thereto. The thickness of the metal foil forming the positive electrode current collector ranges, for example, from 10 to 50 μm, and the thickness of the metal fiber non-woven fabric or the metal porous sheet ranges, for example, from 100 to 600 μm. A positive electrode lead strip 2c for current collection can be formed on the positive electrode current collector 2a. The positive electrode lead strip 2c can be formed monolithically with the positive electrode current collector as shown in FIG. 1, or can be formed by connecting a separately-prepared lead strip to the positive electrode current collector by welding or by other method.

As the positive electrode active material, a sodium-containing transition metal compound is used from a viewpoint of both thermal stability and electrochemical stability. The sodium-containing transition metal compound is preferably a compound having a layered structure which allows sodium to enter and leave a space between layers, but is not particularly limited thereto.

The sodium-containing transition metal compound is preferably at least one selected from the group consisting of, for example, sodium chromite ($NaCrO_2$, etc.) and iron-substituted sodium manganate ($Na_{2/3}Fe_{1/3}Mn_{2/3}O_2$, etc.). In addition, a part of Cr or Na in a sodium chromate can be substituted with another element, and a part of Fe, Mn, or Na in an iron-substituted sodium manganate can be substituted with another element. For example, $Na_{1-x}M^1_xCr_{1-y}M^2_yO_2$ ($0 \le x \le 2/3$, $0 \le y \le 2/3$, each of $M^1$ and $M^2$ is independently a metal element other than Cr and Na, and at least one selected from the group consisting of, for example, Ni, Co, Mn, Fe, and Al), and $Na_{2/3-x}M^3_xFe_{1/3-y}Mn_{2/3-z}M^4_{y+z}O_2$ ($0 \le x \le 1/3$, $0 \le y \le 1/3$, $0 \le z \le 1/3$, each of $M^3$ and $M^4$ is independently a metal element other than Fe, Mn, and Na, and at least one selected from the group consisting of, for example, Ni, Co, Al, and Cr) can also be used. The positive electrode active material can be used in alone or in admixture of two or more kinds. Each of $M^1$ and $M^3$ is an element which occupies a Na site; $M^2$, a Cr site; and $M^4$, a Fe or Mn site.

The first heat resistant binding agent serves to bind the entire positive electrode active material integrally, and to fix the positive electrode active material on the positive electrode current collector. The first heat resistant binding agent is preferably a resin material having a heatproof temperature ranging at least from 120 to 300° C. For example, a heat resistant resin such as polytetrafluoroethylene, polyamide, polyimide, and polyamideimide can be used. Among them, at least one selected from the group consisting of polyamide, polyimide and polyamideimide is preferably used; in particular, an aromatic polyamide (aramid) or an aromatic polyimide is preferable. Among them, an aromatic polyimide is a polymer formed by binding aromatic compounds via imide groups, and has high heat resistance, and a low tendency of oxidative decomposition at the positive-electrode potential. The amount of the first heat resistant binding agent is preferably from 1 to 10 parts by mass, and more preferably from 3 to 5 parts by mass, per 100 parts by mass of the positive electrode active material.

The conductive agent contained in the positive electrode includes graphite, carbon black, a carbon fiber, and the like. Among them, carbon black is particularly preferable since sufficient conduction paths can be easily formed by using a small amount of carbon black. The amount of the conductive agent is preferably from 5 to 15 parts by mass, and more preferably from 5 to 10 parts by mass, per 100 parts by mass of the positive electrode active material.

[Negative Electrode]

Figure 3:
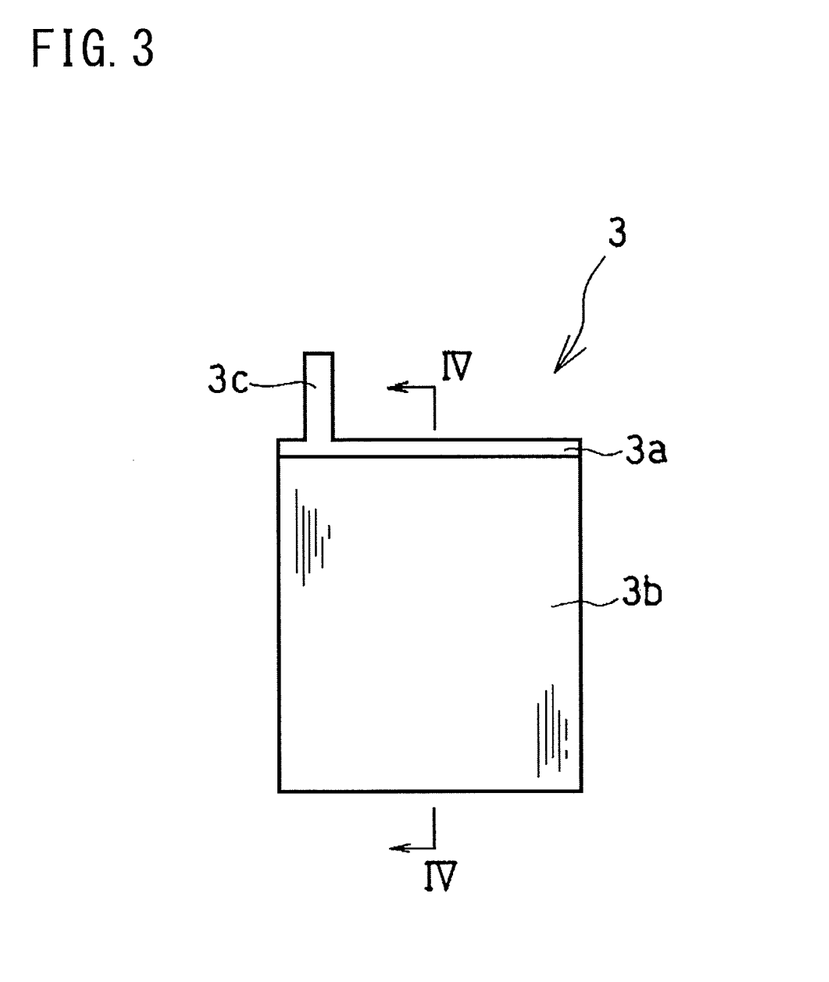
FIG. 3 is a front view of a negative electrode according to one embodiment of the present invention.
Figure 4:
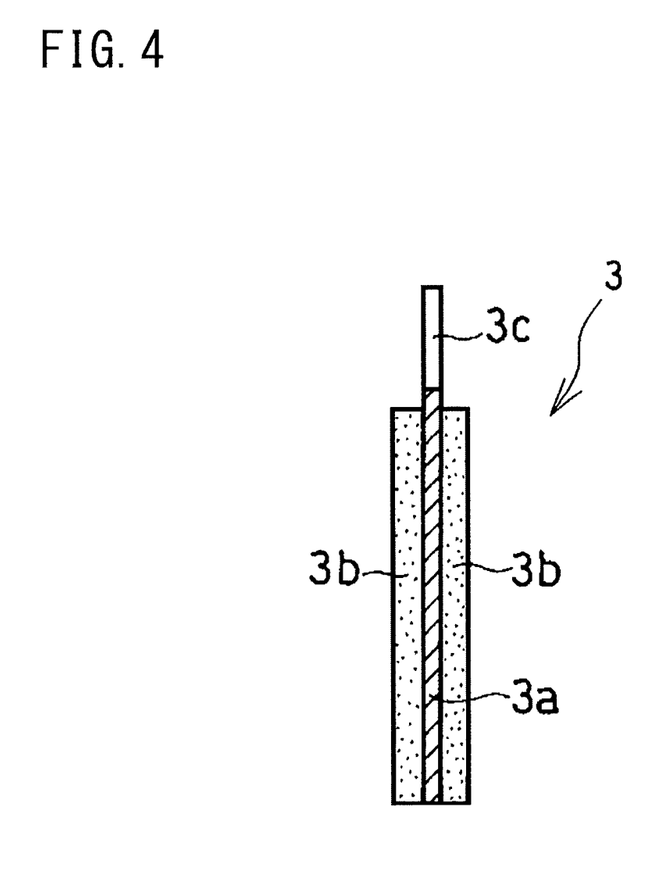
FIG. 4 is a cross-sectional view taken along line IV-IV of FIG. 3.

FIG. 3 is a front view of a negative electrode according to one embodiment of the present invention. FIG. 4 is a cross-sectional view taken along line IV-IV of FIG. 3.

A negative electrode 3 includes a negative electrode current collector 3a and a negative electrode mixture 3b fixed on the negative electrode current collector 3a. The negative electrode mixture includes, for example, a negative electrode active material and a second heat resistant binding agent, and can also include a conductive agent and the like as optional components.

As the negative electrode current collector, metal foil, a metal fiber non-woven fabric, a metal porous sheet, or the like can be used. The metal constituting the negative electrode current collector is preferably copper, a copper alloy, nickel, a nickel alloy, aluminum, an aluminum alloy, or the like, because these are not alloyable with sodium, and are stable at the negative-electrode potential, but is not particularly limited thereto. The thickness of the metal foil forming the negative electrode current collector ranges, for example, from 10 to 50 μm. The thickness of the metal fiber non-woven fabric or the metal porous sheet ranges, for example, from 100 to 600 μm. A negative electrode lead strip 3c for current collection can be formed on the negative electrode current collector 3a. The negative electrode lead strip 3c can be formed monolithically with the negative electrode current collector as shown in FIG. 3, or can be formed by connecting a separately-prepared lead strip to the negative electrode current collector by welding or by other method.

As the negative electrode active material, at least one selected from the group consisting of a sodium-containing titanium compound and a non-graphitizable carbon (hard carbon) is used from a viewpoint of both thermal stability and electrochemical stability. Here, the sodium-containing titanium compound is a material capable of storing and releasing a sodium ion at a lower potential than a potential of the sodium-containing transition metal compound used in the positive electrode.

Both of the sodium-containing titanium compound and a non-graphitizable carbon are in common in that they both possess a structure suitable for receiving a sodium ion. In addition, a sodium-containing titanium compound and non-graphitizable carbon both have a high affinity for a salt of an organic cation having a pyrrolidinium skeleton and a bis(perfluoroalkyl sulfonyl)imide anion, and thus have a low tendency of reductive decomposition of the electrolyte even during charging and discharging of a battery in a high temperature environment. Such an advantageous characteristic is thought to be gained in an early stage of charging and discharging by formation of a stable, highly sodium-ion conductive coating (SEI) on a surface of the negative electrode by the sodium-containing titanium compound or non-graphitizable carbon and the electrolyte.

The sodium-containing titanium compound is preferably sodium titanate. It is preferable to use at least one selected from the group consisting of $Na_2Ti_3O_7$ and $Na_4Ti_5O_{12}$. A part of Ti or Na in sodium titanate can be substituted with another element. For example, $Na_{2-x}M^5_xTi_{3-y}M^6_yO_7$ ($0 \le x \le 3/2$, $0 \le y \le 8/3$, each of $M^5$ and $M^6$ is independently a metal element other than Ti and Na, and at least one selected from the group consisting of, for example, Ni, Co, Mn, Fe, Al, and Cr), and $Na_{4-x}M^7_xTi_{5-y}M^8_yO_{12}$ ($0 \le x \le 11/3$, $0 \le y \le 14/3$, each of $M^7$ and $M^8$ is independently a metal element other than Ti and Na, and at least one selected from the group consisting of, for example, Ni, Co, Mn, Fe, Al, and Cr) can also be used. The sodium-containing titanium compound can be used in alone or in admixture of several kinds of compounds. The sodium-containing titanium compound can be used in combination with non-graphitizable carbon. Each of $M^5$ and $M^7$ is an element which occupies a Na site; and $M^6$ and $M^8$, a Ti site.

The non-graphitizable carbon is a carbon material, heating of which in an inert atmosphere does not develop a graphite structure, and which has randomly-oriented minute crystals of graphite, and has a gap on the order of nanometers between crystal layers. Since the diameter of the sodium ion is 0.95 angstroms, the size of a gap is preferably sufficiently greater than this value. The average interlayer spacing between crystal layers is not particularly limited, but is preferably greater than 0.37 nm, and more preferably greater than or equal to 0.38 nm.

The average particle size (a particle size at a cumulative volume of 50% in the volume particle size distribution) of the non-graphitizable carbon can be, for example, 3 to 20 μm, and is desirably from 5 to 15 μm, from a viewpoint of both higher fillability of the negative electrode active material in the negative electrode and of reduction of a side reaction with the electrolyte. The specific surface area of the non-graphitizable carbon only needs to be in a range of, for example, 1 to 10 m$^2$/g, and is preferably from 3 to 8 m$^2$/g, from a viewpoint of both ensuring acceptability of a sodium ion and of reduction of a side reaction with the electrolyte. The non-graphitizable carbon can be used in alone or in admixture of several kinds of compounds.

The second heat resistant binding agent serves to bind the entire negative electrode active material integrally, and to fix the negative electrode active material on the negative electrode current collector. The second heat resistant binding agent is preferably a resin material having a heatproof temperature ranging at least from 120 to 300° C. For example, heat resistant resins such as polytetrafluoroethylene, polyamide, polyimide, and polyamideimide can be used. Among them, at least one selected from the group consisting of polyamide, polyimide, and polyamideimide is preferably used; in particular, an aromatic polyamide (aramid) or an aromatic polyimide is preferable. These materials are thought to have a low tendency to deteriorate an SEI formed on a surface of the negative electrode due to a low tendency of reductive decomposition at the negative-electrode potential, as well as due to their stability. The amount of the second heat resistant binding agent is preferably from 1 to 10 parts by mass, and more preferably from 3 to 5 parts by mass, per 100 parts by mass of the negative electrode active material.

Similarly to the case of the positive electrode, a conductive agent such as carbon black can be contained in the negative electrode. When non-graphitizable carbon is used, sufficient conductivity can be achieved without a conductive agent since non-graphitizable carbon has conductivity. When a sodium-containing titanium compound is used, it is preferable that a conductive agent be used. The amount of a conductive agent is preferably from 5 to 15 parts by mass, and more preferably from 5 to 10 parts by mass, per 100 parts by mass of the negative electrode active material.

Next, an example of a method for producing the positive electrode or the negative electrode will be described in more detail.

First, a paste is prepared in which the positive electrode mixture or the negative electrode mixture is dispersed in a liquid component (dispersion medium). Next, the paste is applied to either or both of the surfaces of the positive electrode current collector or of the negative electrode current collector, after which the applied coating is dried. Thereafter, the current collector can be rolled together with the applied coating of the positive electrode mixture or of the negative electrode mixture to control the density and/or thickness of the electrode mixture. Rolling can be performed by passing a current collector having a coating of the electrode mixture between a pair of rolls.

The dispersion medium for dispersing the mixture is not particularly limited, but it is preferable to use water because of its relatively easy handling. Meanwhile, from a viewpoint of providing the paste with viscosity, an organic solvent, for example, N-methyl-2-pyrrolidone (NMP), the organic solvent being capable of dissolving the binding agent is preferably used. When an aramid, a polyimide, or a polyamideimide is used as a heat resistant binding agent, the paste can be prepared by using an organic solvent such as NMP as the dispersion medium according to the following method.

When an aramid (e.g., poly-para-phenylenephthalamide) is used as a heat resistant binding agent, the aramid can be added into the organic solvent such as NMP together with the active material and the conductive agent, and then be mixed. Since aramid is soluble in an organic solvent such as NMP, a viscous paste is obtained.

When a polyimide is used as a heat resistant binding agent, first, a polyamide acid solution is prepared by dissolving a polyamide acid in an organic solvent such as NMP. As the polyamide acid, for example, a condensation product of pyromellitic anhydride and diaminodiphenyl ether is used. Heating a polyamide acid produces a polyimide. Thus, to obtain a paste containing a polyimide can be obtained by adding the active material and the conductive agent into the polyamide acid solution, and mixing the resultant solution while being heated at a temperature from 180 to 250° C. A polyamideimide can also be produced by controlling the heating condition so as to limit the degree of dehydration and ring closure of the polyamide acid.

Alternatively, it is also possible to prepare a paste containing a polyamide acid which is a precursor of a polyimide, then apply the paste to the current collector, and convert the polyamide acid to a polyimide while the coating is dried.

[Electrolyte]

In one embodiment of the present invention, for example, a salt of an organic cation having a pyrrolidinium skeleton and a bis(perfluoroalkyl sulfonyl)imide anion is used as the main component of the sodium ion-conductive electrolyte. Such a salt is in a molten state (ionic liquid) not only in a higher temperature range of 120° C. or more and 300° C. or less, but also at a lower temperature. Therefore, the salt is suitable for achieving a heat resistant battery having a broader operating temperature range. In addition, an organic cation having a pyrrolidinium skeleton has a low tendency of decomposition on a surface of the positive or negative electrode, and provides the electrolyte with high sodium ion conductivity. A bis(perfluoroalkyl sulfonyl)imide anion also has a low tendency of decomposition on a surface of the positive or negative electrode, and provides the electrolyte with high sodium ion conductivity.

An organic cation (Py$^+$) having a pyrrolidinium skeleton is represented by, for example, the general formula (1):

wherein each of $R^1$ and $R^2$ is independently an alkyl group having 1 to 8 carbon atoms. More than 8 carbon atoms in $R^1$ or $R^2$ can result in a high melting point of the electrolyte, or high viscosity of the ionic liquid, and thus can prevent normal operation of the battery. From a viewpoint of sufficiently lowering the viscosity of the ionic liquid, each of $R^1$ and $R^2$ is more preferably an alkyl group having 1 to 3 carbon atoms. More specifically, each of $R^1$ and $R^2$ can be independently a methyl group, an ethyl group, a propyl group, an isopropyl group, or the like.

Specific examples of the organic cation include methyl propyl pyrrolidinium cation, ethyl propyl pyrrolidinium cation, methyl ethyl pyrrolidinium cation, dimethyl pyrrolidinium cation, diethyl pyrrolidinium cation, and the like. These compounds may be used in alone or in admixture of several kinds of compounds. Among them, methyl propyl pyrrolidinium cation ($Py13^+$) is preferred, because of high thermal stability in a temperature range of 120 to 300° C. and high electrochemical stability.

A bis(perfluoroalkyl sulfonyl)imide anion (PFSA−) is represented by, for example, the general formula (2):

wherein each of $X^1$ and $X^2$ is independently a perfluoroalkyl group having 1 to 8 carbon atoms. More than 8 carbon atoms in $X^1$ or $X^2$ can result in a high melting point of the electrolyte, or high viscosity of the ionic liquid, and thus can prevent normal operation of the battery. From a viewpoint of sufficiently lowering the viscosity of the ionic liquid, each of $X^1$ and $X^2$ is more preferably a perfluoroalkyl group having 1 to 3 carbon atoms, and particularly preferably a perfluoroalkyl group having 1 to 2 carbon atoms. Specifically, $X^1$ and $X^2$ can each be independently a trifluoromethyl group, a pentafluoroethyl group, a heptafluoropropyl group, or the like.

Specific examples of the bis(perfluoroalkyl sulfonyl)imide anion include bis(trifluoromethyl sulfonyl)imide anion (TFSA−), bis(pentafluoroethyl sulfonyl)imide anion, and the like.

From a viewpoint of increasing sodium ion conductivity, the electrolyte preferably further comprises a salt of a sodium ion ($Na^-$) and a bis(perfluoroalkyl sulfonyl)imide anion (PFSA−). That is, it is desirable that an ionic liquid is used which is constituted of a salt (PyPFSA) of an organic cation having a pyrrolidinium skeleton and a bis(perfluoroalkyl sulfonyl)imide anion as a solvent, and a salt (NaPFSA) of a sodium ion and a bis(perfluoroalkyl sulfonyl)imide anion as a solute. In this case, the bis(perfluoroalkyl sulfonyl)imide anion is preferably an anion represented by the formula (2). For example, it is preferable to use sodium bis(trifluoromethyl sulfonyl)imide (NaTFSA).

Considering the balance of melting point, viscosity, and sodium ion conductivity of the electrolyte, the amount of NaPFSA can be in a range of, for example, 3 to 20 mol %, and preferably ranges from 5 to 15 mol %, relative to the total amount of NaPFSA and PyPFSA.

The electrolyte can contain various additives in addition to the salts described above. However, from a viewpoint of maintaining the heat resistance of the electrolyte, the total content of NaPFSA and PyPFSA preferably ranges from 90 to 100% by mass, and more preferably from 95 to 100% by mass, relative to the amount of the electrolyte contained in the battery.

[Separator]

A separator can be provided between the positive electrode and the negative electrode. Although the material of the separator can be selected in consideration of the operating temperature of the battery, at least one selected from the group consisting of polyphenylene sulfite and a glass fiber is preferably used from a viewpoint of reduction of a side reaction with the electrolyte. Among them, polyphenylene sulfite is highly resistant to fluorine, and has a high affinity for the electrolyte. A separator formed of polyphenylene sulfite can be a non-woven fabric formed of a polyphenylene sulfite fiber, or a film having a porous structure produced through a stretching process. Among them, a non-woven fabric is preferable because it has high porosity and does not inhibit sodium ion conductivity. The thickness of the separator is not particularly limited, but preferably ranges from 20 to 250 μm, and more preferably from 20 to 50 μm.

[Electrode Group]

The heat resistant battery is used in a manner in which an electrode group including the positive and negative electrodes and the electrolyte described above are included in the battery casing. The electrode group is formed by stacking or winding the positive and negative electrodes with the separator interposed therebetween. By using a metal battery casing and allowing one of the positive and negative electrodes to conduct to the battery casing, a portion of the battery casing can be utilized as a first external terminal. Meanwhile, the other one of the positive and negative electrodes is connected, by using a lead strip or the like, to a second external terminal drawn out of the battery casing in an electrically insulated manner from the battery casing.

Next, a configuration of a heat resistant battery according to one embodiment of the present invention will be described with reference to the drawings. However, the configuration of a heat resistant battery of the present invention is not limited to the configuration described below.

Figure 5:
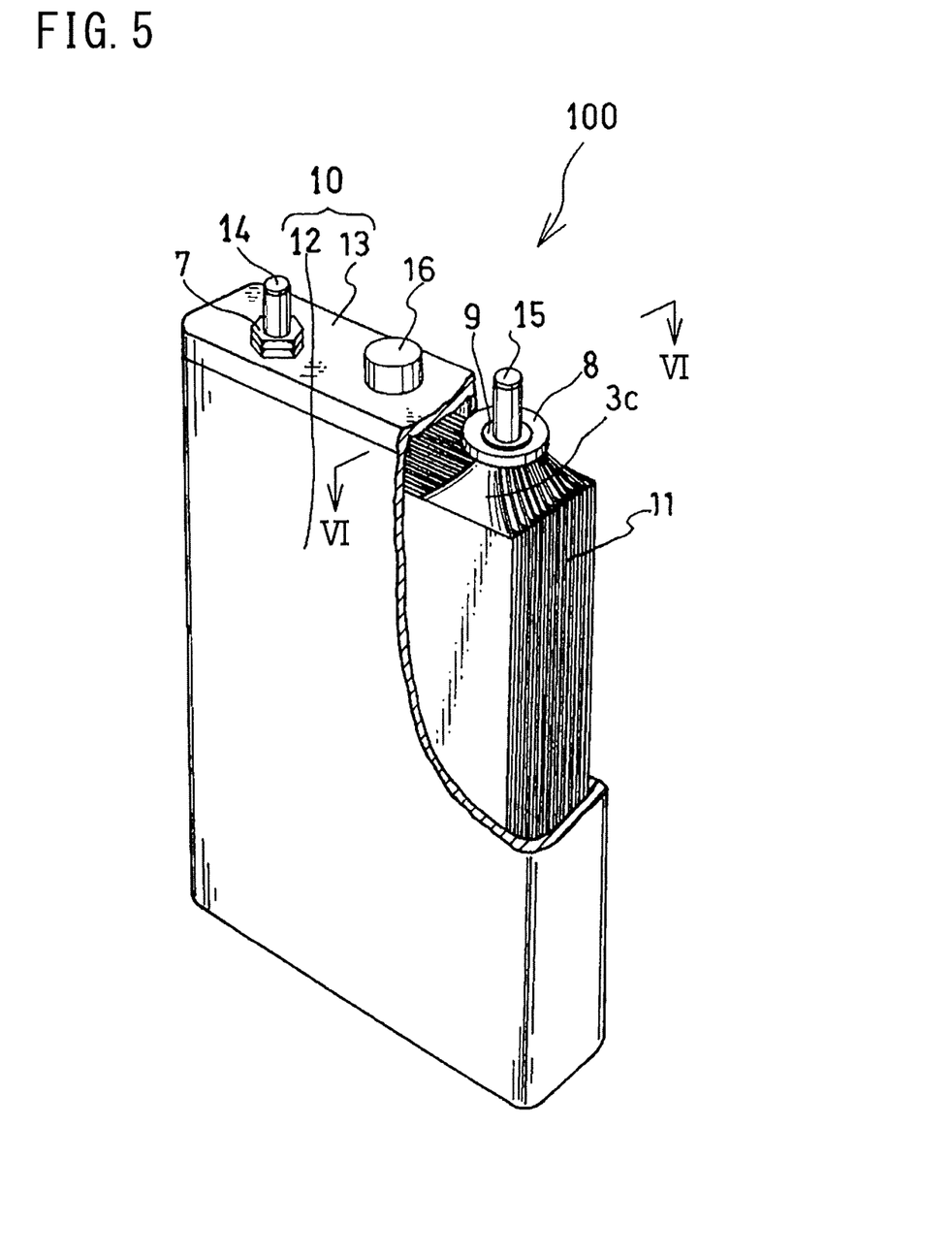
FIG. 5 is a perspective view of a heat resistant battery according to one embodiment of the present invention, with a part of a battery casing cut away.
Figure 6:
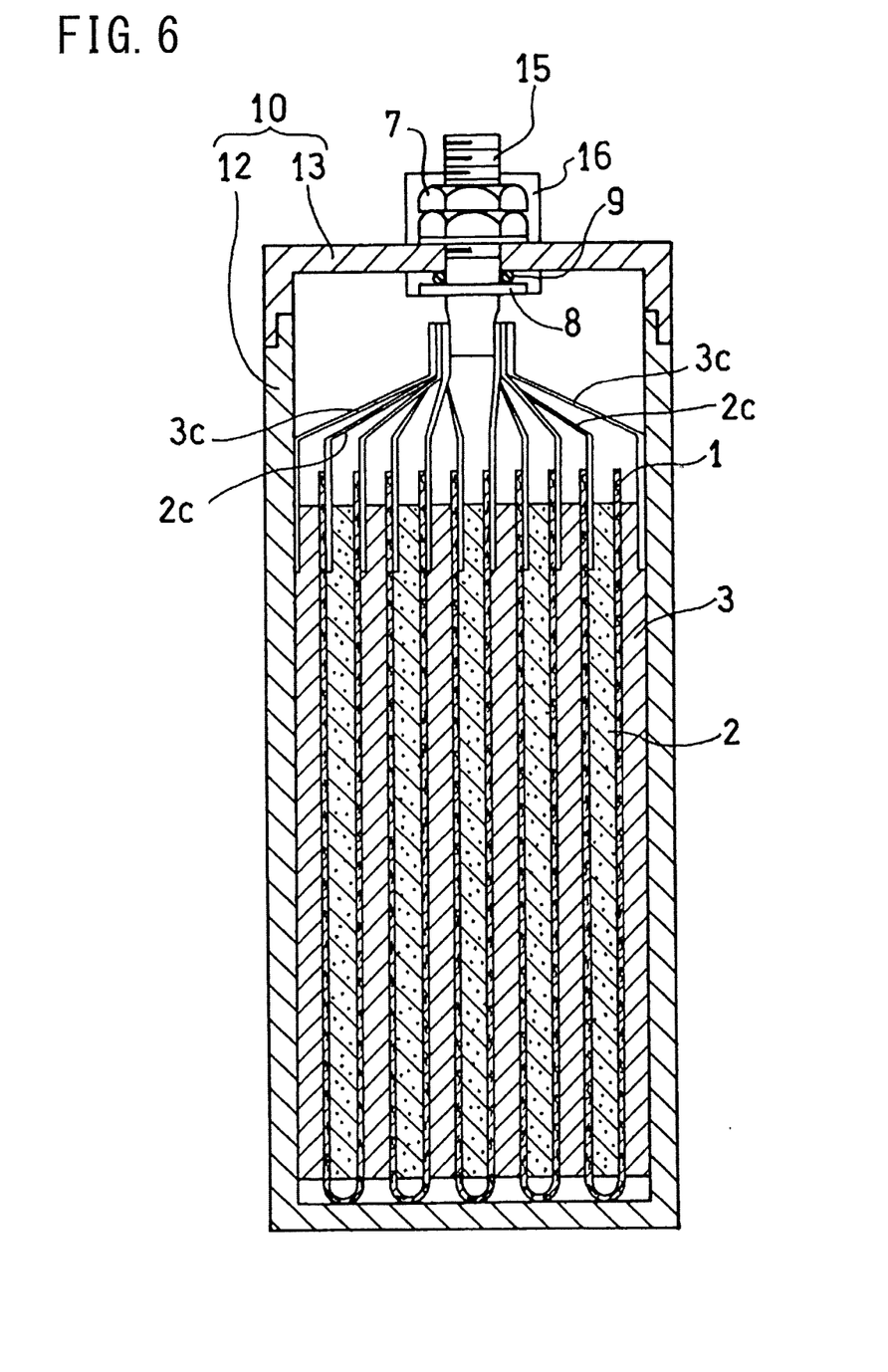
FIG. 6 is a vertical cross-sectional view schematically illustrating a cross section taken along line VI-VI of FIG. 5.

FIG. 5 is a perspective view of a heat resistant battery with a part of the battery casing cut away. FIG. 6 is a vertical cross-sectional view schematically illustrating a cross section taken along line VI-VI of FIG. 5.

A heat resistant battery 100 includes a stacked electrode group 11, an electrolyte (not shown), and a rectangular parallelepiped aluminum battery casing 10 which includes these components therein. The battery casing 10 includes a casing body 12 having an open top and a closed bottom, and a lid unit 13 which closes the top opening. When the heat resistant battery 100 is assembled, the electrode group 11 is produced first, and is then inserted into the casing body 12 of the battery casing 10. Thereafter, an electrolyte in a molten state is added into the casing body 12, and is then impregnated into gaps between the separator 1, the positive electrode 2, and the negative electrode 3 included in the electrode group 11. Alternatively, the electrode group can be impregnated with the electrolyte in a hot molten state (ionic liquid), after which the electrode group impregnated with the electrolyte can be placed into the casing body 12.

An external positive electrode terminal 14 penetrating the lid unit 13 is provided in one side portion of the lid unit 13 in an electrically insulated manner from the battery casing 10. An external negative electrode terminal 15 penetrating the lid unit 13 is provided in the other side portion of the lid unit 13 in an electrically conducting manner to the battery casing 10. A safety valve 16 is provided for releasing gas which will be generated inside when the internal pressure of the battery casing 10 increases.

The stacked electrode group 11 includes multiple positive electrodes 2 and multiple negative electrodes 3, each of which has a rectangular sheet shape, and also includes multiple separators 1 interposed therebetween. Although FIG. 6 illustrates the separators 1 as being formed so as to embrace the positive electrodes 2, the form of the separators is not particularly limited. The plurality of positive electrodes 2 and the plurality of negative electrodes 3 are alternately arranged along a stack direction in the electrode group 11.

A positive electrode lead strip 2c can be formed in one end portion of each of the positive electrodes 2. The plurality of positive electrodes 2 is connected in parallel by bundling the positive electrode lead strips 2c of the plurality of positive electrodes 2, and connecting the bundled positive electrode lead strips 2c to the external positive electrode terminal 14 provided in the lid unit 13 of the battery casing 10. Similarly, a negative electrode lead strip 3c can be formed in one end portion of each of the negative electrodes 3. The plurality of negative electrodes 3 is connected in parallel by bundling the negative electrode lead strips 3c of the plurality of negative electrodes 3, and connecting the bundled negative electrode lead strips 3c to the external negative electrode terminal 15 provided in the lid unit 13 of the battery casing 10. The bundle of the positive electrode lead strips 2c and the bundle of the negative electrode lead strips 3c are preferably provided in a spaced-apart arrangement in left and right sides of one end surface of the electrode group 11 so as not to contact with each other.

Each of the external positive electrode terminal 14 and the external negative electrode terminal 15 has a column shape, and has a spiral thread at least in the externally exposed portion. A nut 7 is engaged with the spiral thread of each terminal, and is screwed to secure the nut 7 against the lid unit 13. A collar 8 is provided in a portion of each terminal inside the battery casing. Screwing the nut 7 causes the collar 8 to be secured against the inner surface of the lid unit 13 via a washer 9.

Next, embodiments of the present invention will be described more specifically based on examples. However, examples described below do not limit the present invention.

Example 1

Production of Positive Electrode

A positive electrode paste was prepared by dispersing in NMP, 85 parts by mass of $NaCrO_2$ (positive electrode active material) having an average particle size of 10 μm, 10 parts by mass of acetylene black (conductive agent), and 5 parts by mass of a polyimide (first heat resistant binding agent). A positive electrode having a total thickness of 180 μm, including 80 μm thick positive electrode mixture layers on both surfaces was prepared by applying the resultant positive electrode paste to both surfaces of 20 μm thick aluminum foil, drying sufficiently the resultant, and then performing rolling.

(Production of Negative Electrode)

A negative electrode paste was prepared by dispersing in NMP, 92% by mass of non-graphitizable carbon (negative electrode active material) having an average particle size of 9 μm, a specific surface area of 6 $m^2$/g, a true density of 1.52 g/$cm^3$, and an average interlayer spacing of 0.38 nm, and 8 parts by mass of the same polyimide (second heat resistant binding agent) as used in the positive electrode. A negative electrode having a total thickness of 78 μm, including 30 μm thick negative electrode mixture layers on both surfaces was prepared by applying the resultant negative electrode paste to both surfaces of 18 μm thick copper foil, drying sufficiently the resultant, and then performing rolling.

(Production of Electrode Group)

The positive electrode was cut into rectangular sheets each having a size of 100×100 mm, and the negative electrode was cut into rectangular sheets each having a size of 105×105 mm to thereby prepare each 10 of positive and negative electrodes. A lead strip for current collection was formed on one side-end portion of one side of each of the positive and negative electrodes. One of the positive electrodes and one of the negative electrodes respectively had the positive electrode mixture layer and the negative electrode mixture layer only on one surface. A polyphenylene sulfite (PPS) non-woven fabric (porosity: 60%, weight per unit area: 12 g/$m^2$) having a size of 110×110 mm and a thickness of 20 μm was interposed between the positive and negative electrodes, and these components were stacked so that the positive electrode lead strips overlapped with one another and the negative electrode lead strips overlapped with one another, and the bundle of the positive electrode lead strips and the bundle of the negative electrode lead strips were arranged in longitudinally symmetric positions, thereby giving an electrode group. At either end of the electrode group, an electrode having the electrode mixture layer only on one side was disposed so that the electrode mixture layer faced toward an electrode of the opposite polarity.

(Electrolyte)

An electrolyte was prepared which was a mixture of sodium bis(trifluoromethyl sulfonyl)imide (NaTFSA) and methyl propyl pyrrolidinium bis(trifluoromethyl sulfonyl) imide (Py13PFSA) in a molar ratio of 1:9. The melting point at which the electrolyte becomes an ionic liquid is 7° C., and the pyrolysis temperature is 423° C. The viscosity at a temperature of 200° C. is 2.6 mPa·s.

(Assembly of Heat Resistant Battery)

A heat resistant battery having a nominal capacity of 1.8 Ah of a configuration as shown in FIGS. 5 and 6 is constructed by enclosing the electrode group and the electrolyte described above in an aluminum battery casing.

[Evaluation]

Figure 7:
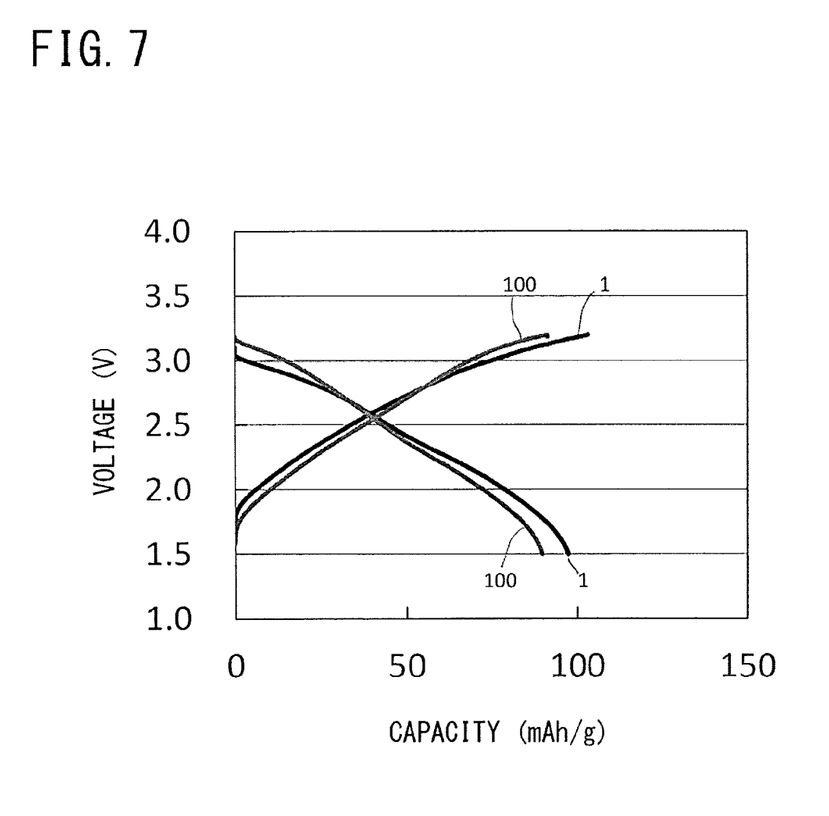
FIG. 7 is a diagram illustrating charge/discharge curves respectively for the first cycle and for the 100th cycle of the heat resistant battery of Example 1.

The heat resistant battery produced was heated to a temperature of 200° C. in a constant temperature chamber. Under a stable temperature condition, constant-current charging and discharging was repeated at a current value equivalent to the hour rate of 0.2 C-rate and at voltages ranging from 1.5 to 3.3 V. Charge/discharge curves respectively for the first cycle and for the 100th cycle are shown in FIG. 7 illustrates. A relationship between discharged capacity density and the number of cycles, and a relationship between coulombic efficiency and the number of cycles are shown in FIG. 8.

Figure 8:
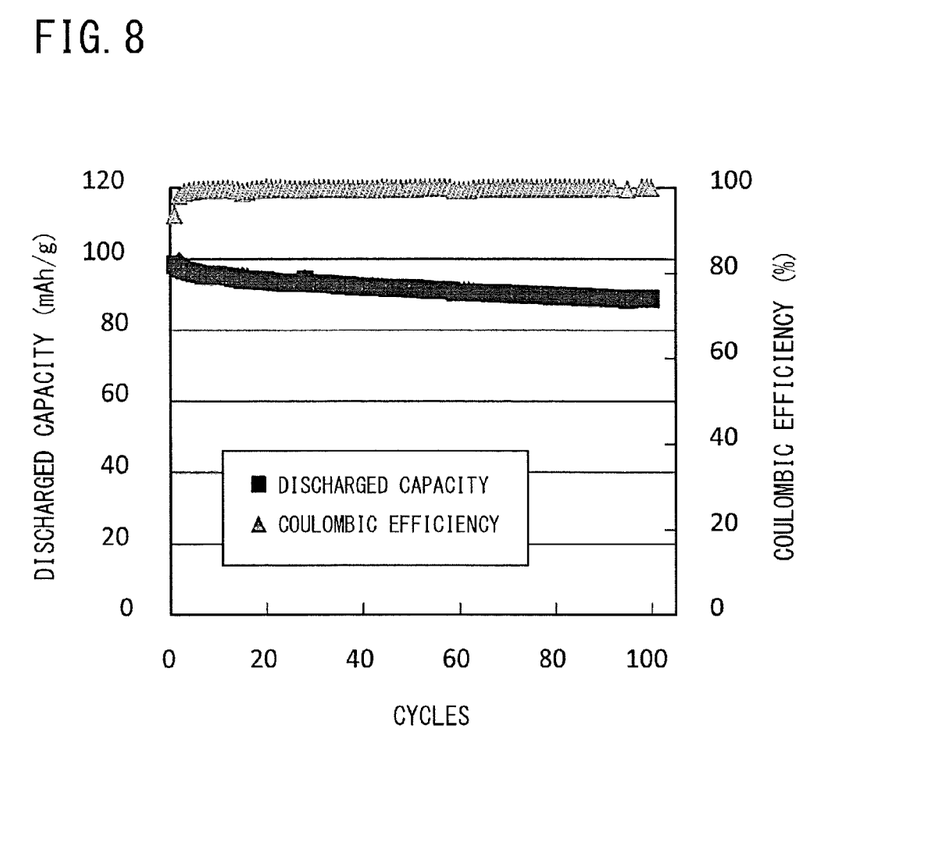
FIG. 8 is a diagram illustrating a relationship between discharged capacity and the number of cycles, and a relationship between coulombic efficiency and the number of cycles of the heat resistant battery of Example 1.

From FIGS. 7 and 8, it can be understood that a battery of this example exhibits a capacity retention rate of about 90% even after 100 cycles, and that the coulombic efficiency remains high even after 100 cycles, and thus reversibility of charging and discharging is high.

Comparative Example 1

A battery was produced and evaluated in the same manner as in Example 1 except that a mixture of sodium bis (fluorosulfonyl)imide (NaFSA) and potassium bis(fluorosulfonyl)imide (KFSA) in a molar ratio of 56:44 was used as the electrolyte. The melting point at which the electrolyte becomes an ionic liquid is 57° C. The viscosity at a temperature of 200° C. is 2.1 mPa·s. A relationship between discharged capacity density and the number of cycles, and a relationship between coulombic efficiency and the number of cycles are illustrated in FIG. 9.

Figure 9:
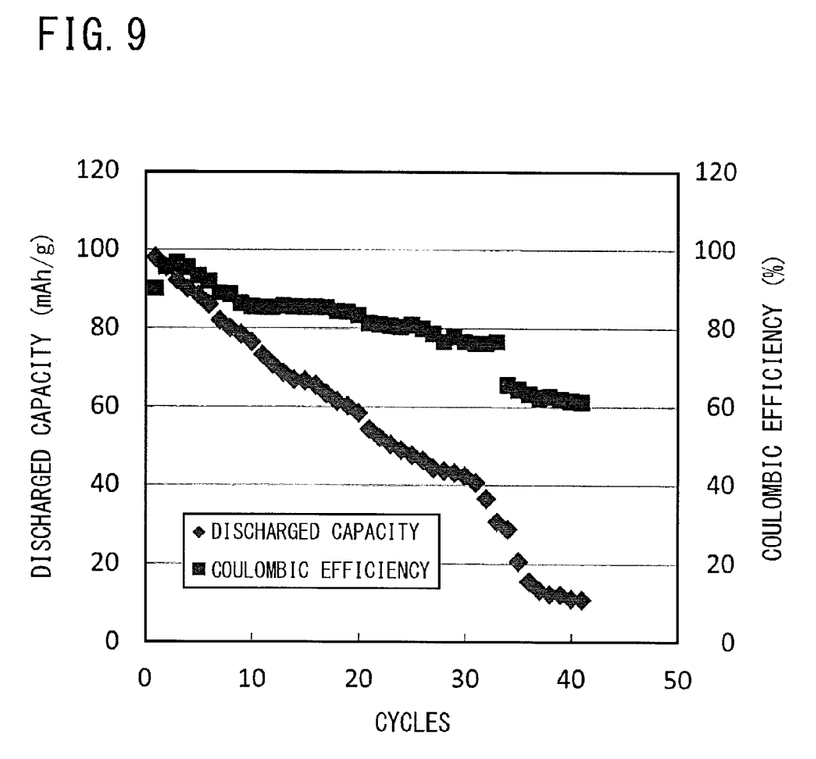
FIG. 9 is a diagram illustrating a relationship between discharged capacity and the number of cycles, and a relationship between coulombic efficiency and the number of cycles of the heat resistant battery of Comparative Example 1.

From FIG. 9, it can be understood that the battery of Comparative Example 1 exhibits discharged capacity and coulombic efficiency that significantly decrease with an increase in the number of cycles as compared to the battery of Example 1. Such decreases are thought to be due to decomposition of an electrolyte component.

Comparative Example 2

A battery was produced and evaluated in the same manner as in Example 1 except that negative electrodes formed of tin-plated aluminum foil (thickness of the tin-plated layer: 130 nm) were used in place of the negative electrodes containing non-graphitizable carbon. As a result, similarly to Comparative Example 1, discharged capacity and coulombic efficiency significantly decreased with an increase in the number of cycles as compared to the battery of Example 1. This is thought to be caused by melting of a tin-sodium alloy formed on the negative electrodes, and hence by deterioration of the negative electrodes.

Example 2

A battery was produced and evaluated in the same manner as in Example 1 except that polytetrafluoroethylene (PTFE powder) was used as the second heat resistant binding agent, and that water was used in place of the polyimide as the dispersion medium. As a result, discharged capacity and coulombic efficiency slightly decreased with an increase in the number of cycles as compared to the battery of Example 1. This is thought to be a decrease in the binding force of PTFE at a higher temperature, which caused the negative electrode active material to flake off from the current collectors (copper foil), and thus the negative electrode active material failed to contribute to charging and discharging.

Example 3

A battery was produced and evaluated in the same manner as in Example 1 except that a glass fiber non-woven fabric (porosity: 70%, weight per unit area: 20 g/m$^2$) having a thickness of 50 μm was used in place of the PSS separators. As a result, it was found that the battery exhibited a capacity retention rate of about 90%, and coulombic efficiency also remained nearly 100% even after 100 cycles.

Example 4

A battery was produced and evaluated in the same manner as in Example 1 except that non-graphitizable carbon having an average particle size of 9 μm, a specific surface area of 5 m$^2$/g, a true density of 1.52 g/cm$^3$, and an average interlayer spacing of 0.37 nm was used. As a result showed that the battery exhibited a capacity retention rate of about 90%, and coulombic efficiency also remained nearly 100% even after 100 cycles. However, the discharge potential of the negative electrodes was slightly high, and the battery voltage thus slightly decreased.

Example 5

A battery was produced and evaluated in the same manner as in Example 1 except that $Na_2Ti_3O_7$ having an average particle size of 9 μm and acetylene black were used in place of the non-graphitizable carbon, and that the mass ratio among $Na_2Ti_3O_7$, acetylene black and the polyimide was changed to 85:10:5. As a result, it was found that the battery exhibited a capacity retention rate of about 90%, and coulombic efficiency also remained nearly 100% even after 100 cycles.

Example 6

A heat resistant battery produced in the same manner as in Example 1 was heated to a temperature of 120° C., and charging and discharging was repeated in the same manner as in Example 1, after which cycle characteristics were evaluated. As a result, cycle characteristics similar to those shown in FIGS. 7 and 8 were achieved, and the battery exhibited a capacity retention rate of about 90% even after 100 cycles.

Example 7

A heat resistant battery produced in the same manner as in Example 1 was heated to a temperature of 300° C., and charging and discharging was repeated in the same manner as in Example 1, after which cycle characteristics were evaluated. As a result, cycle characteristics similar to those shown in FIGS. 7 and 8 were achieved, and the battery exhibited a capacity retention rate of about 86% even after 100 cycles.

INDUSTRIAL APPLICABILITY

Since the heat resistant battery of the present invention operates stably in a higher temperature range of, for example, 120° C. or more and 300° C. or less, the heat resistant battery of the present invention is therefore useful for applications in which use in such a temperature range is expected, the applications including, for example, a sensor placed in an electric furnace, a power source for an oil field drill, and the like.

REFERENCE SIGNS LIST

100: HEAT RESISTANT BATTERY
1: SEPARATOR
2: POSITIVE ELECTRODE
2c: POSITIVE ELECTRODE LEAD STRIP
3: NEGATIVE ELECTRODE
3c: NEGATIVE ELECTRODE LEAD STRIP
7: NUT
8: COLLAR
9: WASHER
10: BATTERY CASING
11: ELECTRODE GROUP
12: CASING BODY
13: LID UNIT
14: EXTERNAL POSITIVE ELECTRODE TERMINAL
15: EXTERNAL NEGATIVE ELECTRODE TERMINAL
16: SAFETY VALVE

The invention claimed is:
1. A heat resistant battery comprising:
a positive electrode including a positive electrode current collector and a positive electrode active material fixed on the positive electrode current collector, wherein the positive electrode active material comprises a sodium- containing transition metal compound capable of electrochemically storing and releasing a sodium ion;

a negative electrode including a negative electrode current collector and a negative electrode active material fixed on the negative electrode current collector, wherein the negative electrode active material comprises at least one selected from the group consisting of a sodium-containing titanium compound and a non-graphitizable carbon, each of the sodium-containing titanium compound and the non-graphitizable carbon being capable of storing and releasing a sodium ion at a lower potential than a potential of the sodium-containing transition metal compound; and a sodium ion-conductive electrolyte provided at least between the positive electrode and the negative electrode, wherein the sodium ion-conductive electrolyte comprises a salt of an organic cation having a pyrrolidinium skeleton and a bis(perfluoroalkyl sulfonyl) imide anion, and a salt of a sodium ion and a bis (perfluoroalkyl sulfonyl)imide anion, wherein 90 to 100% by mass of the sodium ion-conductive electrolyte is possessed by the salt of the organic cation having the pyrrolidinium skeleton and the bis (perfluoroalkyl sulfonyl)imide anion and the salt of the sodium ion and the bis(perfluoroalkyl sulfonyl)imide anion together.

2. The heat resistant battery according to claim 1, wherein the organic cation having a pyrrolidinium skeleton is represented by the general formula (1):

wherein each of $R^1$ and $R^2$ is independently an alkyl group having 1 to 8 carbon atoms.

3. The heat resistant battery according to claim 1, wherein the bis(perfluoroalkyl sulfonyl)imide anion is represented by the general formula (2):

wherein each of $X^1$ and $X^2$ is independently a perfluoroalkyl group having 1 to 8 carbon atoms.

4. The heat resistant battery according to claim 1, further comprising a separator interposed between the positive electrode and the negative electrode, wherein the separator is formed of at least one selected from the group consisting of a glass fiber and polyphenylene sulfite.

5. The heat resistant battery according to claim 1, wherein the positive electrode comprises a first heat resistant binding agent which binds the positive electrode active material on the positive electrode current collector, the negative electrode comprises a second heat resistant binding agent which binds the negative electrode active material on the negative electrode current collector, and each of the first heat resistant binding agent and the second heat resistant binding agent independently comprises at least one selected from the group consisting of polyamide, polyimide, and polyamideimide.

6. The heat resistant battery according to claim 1, wherein an average interlayer spacing of a microcrystal contained in the non-graphitizable carbon is greater than 0.37 nm.

7. A method for charging and discharging a heat resistant battery, the heat resistant battery comprising:
a positive electrode including a positive electrode current collector and a positive electrode active material fixed on the positive electrode current collector, wherein the positive electrode active material comprises a sodium-containing transition metal compound capable of electrochemically storing and releasing a sodium ion, a negative electrode including a negative electrode current collector and a negative electrode active material fixed on the negative electrode current collector, wherein the negative electrode active material comprises at least one selected from the group consisting of a sodium-containing titanium compound and a non-graphitizable carbon, each of the sodium-containing titanium compound and the non-graphitizable carbon being capable of storing and releasing a sodium ion at a lower potential than a potential of the sodium-containing transition metal compound, and a sodium ion-conductive electrolyte provided at least between the positive electrode and the negative electrode, the sodium ion-conductive electrolyte containing a salt of an organic cation having a pyrrolidinium skeleton and a bis(perfluoroalkyl sulfonyl)imide anion and a salt of a sodium ion and a bis(perfluoroalkyl sulfonyl)imide anion, wherein 90 to 100% by mass of the sodium ion-conductive electrolyte is possessed by the salt of the organic cation having the pyrrolidinium skeleton and the bis(perfluoroalkyl sulfonyl)imide anion and the salt of the sodium ion and the bis(perfluoroalkyl sulfonyl)imide anion together, the method comprising the step of:
charging and discharging the heat resistant battery in a heated condition in a temperature range of 120° C. or more and 300° C. or less.

8. The heat resistant battery according to claim 3, wherein each of $X^1$ and $X^2$ in the general formula (2) is independently a perfluoroalkyl group having 1 to 3 carbon atoms.

9. The heat resistant battery according to claim 5, wherein the heat resistant battery has an operating temperature range of 120° C. to 300° C.

10. The heat resistant battery according to claim 2, wherein the organic cation having a pyrrolidinium skeleton is at least one selected from the group consisting of methyl propyl pyrrolidinium cation, ethyl propyl pyrrolidinium cation, methyl ethyl pyrrolidinium cation, dimethyl pyrrolidinium cation, and diethyl pyrrolidinium cation.

* * * * *